US012711320B2

(12) United States Patent
Chen

(10) Patent No.: US 12,711,320 B2
(45) Date of Patent: Aug. 18, 2026

(54) CONVERSATIONAL MEDIATOR SYSTEM AND METHOD FOR INTERACTING WITH CONVERSATIONAL APPLICATION FOR ENHANCED USER EXPERIENCE AND CONTEXTUAL RESPONSIVENESS

(71) Applicant: MEDIATEK INC., Hsin-Chu (TW)

(72) Inventor: Ming-Yu Chen, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 165 days.

(21) Appl. No.: 18/399,589

(22) Filed: Dec. 28, 2023

(65) Prior Publication Data

US 2025/0217599 A1 Jul. 3, 2025

(51) Int. Cl.

*G06F 40/40* (2020.01)
*G06F 40/35* (2020.01)
*G06N 3/0475* (2023.01)
*H04L 67/50* (2022.01)

(52) U.S. Cl.

CPC .............. *G06F 40/40* (2020.01); *G06F 40/35* (2020.01); *G06N 3/0475* (2023.01); *H04L 67/535* (2022.05)

(58) Field of Classification Search

CPC .............................. G06F 40/40; G06N 3/0475
See application file for complete search history.

(56) References Cited

U.S. PATENT DOCUMENTS 8,818,795 B1 * 8/2014 Cassimatis ............. G06F 40/30
704/9
10,115,400 B2 * 10/2018 Wilberding ............. G06F 3/167
10,629,191 B1 * 4/2020 Cheng ................... G06F 40/205
11,694,281 B1 * 7/2023 Liu ....................... H04L 51/224
704/9
11,769,017 B1 * 9/2023 Gray ....................... G06F 40/56
704/9
2015/0302002 A1 * 10/2015 Mathias .................. G06F 40/56
704/9
2016/0110347 A1 * 4/2016 Kennewick, Jr. ....... G10L 15/18
704/9
2016/0313868 A1 * 10/2016 Weng ..................... B60K 35/85
2019/0327330 A1 * 10/2019 Natarajan ......... G06F 16/24578
2020/0073982 A1 * 3/2020 Kolluri Venkata Sesha ...............
G06F 11/3082
2020/0342018 A1 * 10/2020 Lange ................... G06F 16/215
2020/0379787 A1 * 12/2020 Martin .................. G06F 16/176
2023/0074406 A1 * 3/2023 Baeuml ............ G06F 16/90332
2023/0274094 A1 8/2023 Tunstall-Pedoe (Continued)

*Primary Examiner* — Shaun Roberts

(74) *Attorney, Agent, or Firm* — Winston Hsu

(57) ABSTRACT

A conversational mediator system includes: a mediator input generating module, a context management module and a response aggregation module. The mediator input generating module is configured to generate a mediator input based on a user input and auxiliary information associated with the user input, and accordingly send the mediator input to at least one conversational application. The context management module is configured to extract the auxiliary information from user data and update the user data based on responses to the mediator input that is generated by the at least one conversational application. The response aggregation module is configured to summarize and aggregate the responses to the mediator input that is generated by the at least one conversational application to generate a consolidated response.

12 Claims, 5 Drawing Sheets

(56) References Cited

U.S. PATENT DOCUMENTS

2023/0334773 A1 10/2023 Shah
2024/0403341 A1 * 12/2024 Berglund ............ G06F 16/3326

* cited by examiner

CONVERSATIONAL MEDIATOR SYSTEM AND METHOD FOR INTERACTING WITH CONVERSATIONAL APPLICATION FOR ENHANCED USER EXPERIENCE AND CONTEXTUAL RESPONSIVENESS

BACKGROUND

The present invention relates to conversational applications, and more particularly, to a conversational mediator system and related method for interacting with conversational applications for enhanced user experience and contextual responsiveness.

Artificial intelligence (AI)-based conversational applications, such as chatbots, conversational agents, and dialog system, particularly those powered by large language models like ChatGPT, have become increasingly popular as tools for providing information and solutions to users. Despite their growing adoption, these AI-based conversational applications have several limitations. First, AI-based conversational applications have constrained knowledge base and can only provide information based on their pre-trained data, which may not be exhaustive or up-to-date. Second, AI-based conversational applications usually have limited interaction memory. This means AI-based conversational applications lack the capability to remember long or complex conversational histories, which could be essential for providing context-sensitive responses. Third, AI-based conversational applications generally do not have access to individual user preferences, local information, or the context in which the user is operating. This means the AI-based conversational applications lack user data. In view of this, users may find information and solutions offered by the AI-based conversational application to be general and not tailored to their specific needs or context. In view of this, there is a need to provide a sophisticated solution to ameliorate the aforementioned issues.

SUMMARY

With this in mind, it is one object of the present invention to provide a conversational mediator system and method for aggregating and summarizing dialogues between user and conversational applications. The conversational mediator system and method serve as an intermediary layer between the user and multiple conversation applications. Specifically, the conversational mediator system and method gathers user inputs and contextual information, accordingly queries multiple sources for relevant data, and subsequently aggregating and summarizing response from multiple sources into a consolidated response for the user. Furthermore, the consolidated response is also stored as user-specific context for future interactions, enhancing personalization and efficacy. By doing so, the conversation applications can offer a more comprehensive and context-aware responses to the user. This approach not only augments the accuracy and completeness of the information provided by the conversational applications but also enhances the user experience by providing personalized and context-aware responses to the user.

According to one embodiment, a conversational mediator system is provided. The conversational mediator system comprises: a mediator input generating module, a context management module and a response aggregation module. The mediator input generating module is configured to generate a mediator input based on a user input and auxiliary information associated with the user input, and accordingly send the mediator input to at least one conversational application. The context management module is configured to extract the auxiliary information from user data and update the user data based on responses to the mediator input that is generated by the at least one conversational application. The response aggregation module is configured to summarize and aggregate the responses to the mediator input that is generated by the at least one conversational application to generate a consolidated response.

According to one embodiment, a conversational mediating method is provided. The method comprises: extracting auxiliary information associated with a user input from user data; generating a mediator input based on the user input and the auxiliary information; sending the mediator input to at least one conversational application; summarizing and aggregating responses to the mediator input that is generated by the at least one conversational application to generate a consolidated response; and updating the user data based on the responses to the mediator input that is generated by the at least one conversational application.

These and other objectives of the present invention will no doubt become obvious to those of ordinary skill in the art after reading the following detailed description of the preferred embodiment that is illustrated in the various figures and drawings.

DETAILED DESCRIPTION

In the following description, numerous specific details are set forth in order to provide a thorough understanding of the present embodiments. It will be apparent, however, to one having ordinary skill in the art that the specific detail need not be employed to practice the present embodiments. In other instances, well-known materials or methods have not been described in detail in order to avoid obscuring the present embodiments.

Reference throughout this specification to “one embodiment” or “an embodiment” means that a particular feature, structure or characteristic described in connection with the embodiment or example is included in at least one embodiment of the present embodiments. Thus, appearances of the phrases “in one embodiment” or “in an embodiment” in various places throughout this specification are not necessarily all referring to the same embodiment. Furthermore, the particular features, structures or characteristics may be combined in any suitable combinations and/or sub-combinations in one or more embodiments.

Figure 1:
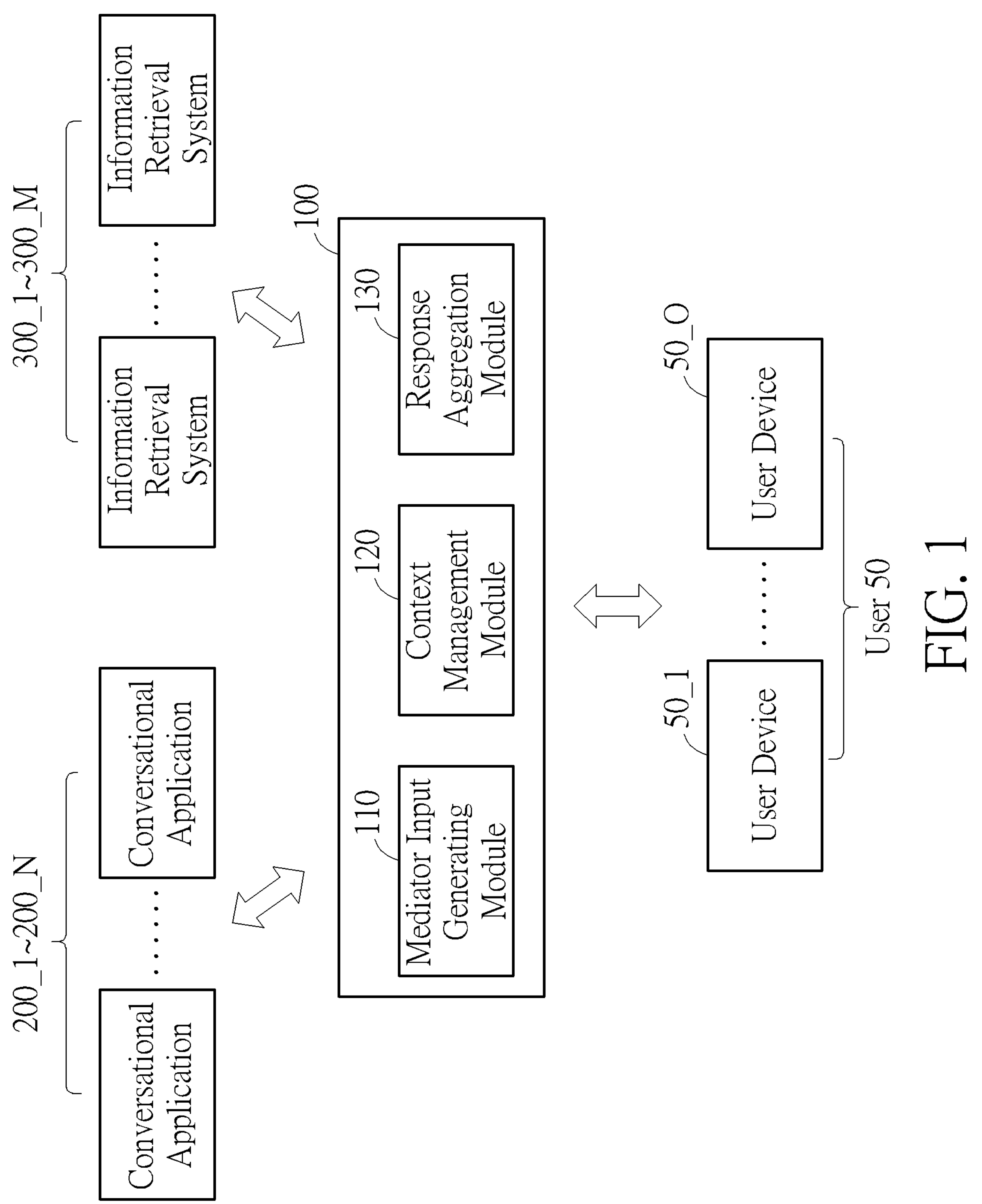
FIG. 1 illustrates architecture of a conversational mediator system according to one embodiment of the present invention.

FIG. 1 illustrates architecture of a conversational mediator system according to one embodiment of the present invention. As illustrated, a conversational mediator system 100 could receive user input from one of user devices

50_1-50_O that belongs to a same user 50. Specifically, the conversational mediator system 100 may be deployed on at least one of user devices 50_1-50_O or implemented as a cloud service that is accessible by the user devices 50_1-50_O. Furthermore, the user input can be procured from any one of the user devices 50_1-50_O, via various modes of human-machine interactions, which includes but is not limited to, keyboard entries and voice commands made by the user.

The user input could be user query, user inquiry, user prompt, and/or user request. The conversational mediator system 100 can be realized through rule-based methods or AI-based methods. Acting as an intermediary, the conversational mediator system 100 convert the user input into a mediator input to interact with a plurality of conversational applications 200_1-200_N, and/or a plurality of information retrieval systems 300_1-300_M, thereby to improve the efficiency of the interactions.

The conversational applications 200_1-200_N encompasses any software or system capable of conducting a dialogue or conversation with the user 50. The conversational applications 200_1-200_N can include but is not limited to, applications developed using rule-based, template-based, retrieval-based, decision tree-based, language model-based methodologies, or any combination thereof. The conversational applications 200_1-200_N utilizes datasets and algorithms to comprehend, generate, and process natural language text in a conversational manner. This approach allows the conversational applications 200_1-200_N to engage in dynamic and coherent dialogues, understanding the user input and generating contextually coherent responses. In addition, the information retrieval systems 300_1-300_M encompasses any software or system capable of performing information retrieval tasks. This includes, but is not limited to, search engines, database management systems, information retrieval platforms and so on. The information retrieval systems 300_1-300_M are operable to parse and analyze user inquiry to extract relevant information from database, and use algorithms to ensure the accuracy and relevance of retrieved information.

The conversational mediator system 100 can parse and process the user input of natural language with predefined rules. In some embodiments, the conversational mediator system 100 may integrate artificial intelligence technologies to comprehend and handle the user input more precisely, generating more accurate and relevant mediator input. In some embodiments, the mediator input generated by the conversational mediator system is not confined to expressions in natural language but can also include non-natural language symbols, codes, or other forms of expressions to meet the interaction rules or preferences of the conversational applications 200_1-200_N.

In some embodiments, the conversational mediator system 100 is able to tailor the mediator input by discerning inherent characteristics and capabilities of conversational applications 200_1-200_N to elicit optimal responses. This means the conversational mediator system 100 may generate multiple mediator inputs with respect to a same user input, thereby aligning each mediator input closely with the inherent characteristics and capabilities of conversational applications 200_1-200_N.

The conversational mediator system 100 comprises a mediator input generating module 110, a context management module 120 and a response aggregation module 130. Whenever the conversational mediator system 100 receives the user input, the context management module 120 searches user data stored on one or more user devices 50_1-50_O, thereby extract relevant auxiliary information that can ensure the conversational applications 200_1-200_N, and/or the information retrieval systems 300_1-300_M has more comprehensive understandings of the user's intent.

Typically, the use data incorporates various information to describe user attributes and predilections, which encompasses personal information, such as age, gender, profession, educational background, and place of residence. In one embodiment, the use data also incorporates real-world behavioral and on-line behavioral information, including movement trajectory, location, browsing history, search history, purchasing patterns, and/or activities on social media platforms, such as likes, shares, and comments, to portray the user's interests. In one embodiment, the user data may also incorporate preference information encompasses user-specific preference settings, such as language preferences. For dialogic interactions or communications with conversational applications 200_1-200_N, the user data incorporates interaction history information encompasses historical dialogues (e.g., inquiries and responses) with the conversational applications 200_1-200_N. That is, the user data enable the conversational applications 200_1-200_N to generate more personalized, precise and contextual-aware responses to the user input based on in-depth understanding of user needs and preferences.

For example, if the user input is an inquiry about surrounding restaurants or a suggestion about popular date locations, the context management module 120 could search the user data to retrieve auxiliary information regarding user age, user gender, user residence, user favorite food, and so on. For example, if the user input is an inquiry about suggestions for dinner, the context management module 120 could search the user data to retrieve auxiliary information regarding user past activity records. It could comprise what the user had for breakfast and lunch, user current location and user favorite food. Such auxiliary information allows the conversational applications 200_1-200_N, and the plurality of information retrieval systems 300_1-300_M to tailor its responses with greater precision.

Based on both the original user input and the auxiliary information extracted from the user data, the mediator input generating module 110 generates one or more mediating inputs. The conversational mediator system 100 sends the one or more mediating inputs to the conversational applications 200_1-200_N and the information retrieval systems 300_1-300_M, respectively. According to the one or more mediating input, the conversational applications 200_1-200_N and the information retrieval systems 300_1-300_M outputs respective responses. The one or more mediating input ensures that responses generated by the conversational applications 200_1-200_N and the information retrieval systems 300_1-300_M are fine-tuned to the user input and the user data, culminating in a highly personalized and effective user experience. In addition, in some embodiments, the conversational mediator system 100 sends the user input to the information retrieval systems 300_1-300_M first, and then generates the one or more mediator input based on information provided by the information retrieval systems 300_1-300_M, the user input and the auxiliary information. This is because the information provided by the information retrieval systems 300_1-300_M may be more up-to-date.

Response from the conversational applications 200_1-200_N and the information retrieval systems 300_1-300_M will be summarized and aggregated by the response aggregation module 130. The response aggregation module 130 accordingly generates a consolidated response, which will be easier to the user to understand. In some embodiments, the conversational mediator system 100 may incorporate AI technologies, it can significantly augment the proficiency in analyzing and summarizing the responses from the conversational applications 200_1-200_N and the information retrieval systems 300_1-300_M, such that the conversational mediator system 100 can offer more nuanced and tailored interactions, thereby enhancing the user's overall experience and the value derived from the conversational applications 200_1-200_N and the information retrieval systems 300_1-300_M.

On other hand, the context management module 120 could use the consolidated response generated by the response aggregation module 130 or original responses directly from the conversational applications 200_1-200_N and the information retrieval systems 300_1-300_M to update the user data. For example, the context management module 120 could use the consolidated response or the original responses to update interaction history information in the user data. In one embodiment, the context management module 120 could synchronize the updating of the user data between the user devices 50_1-50_O.

Figure 2:
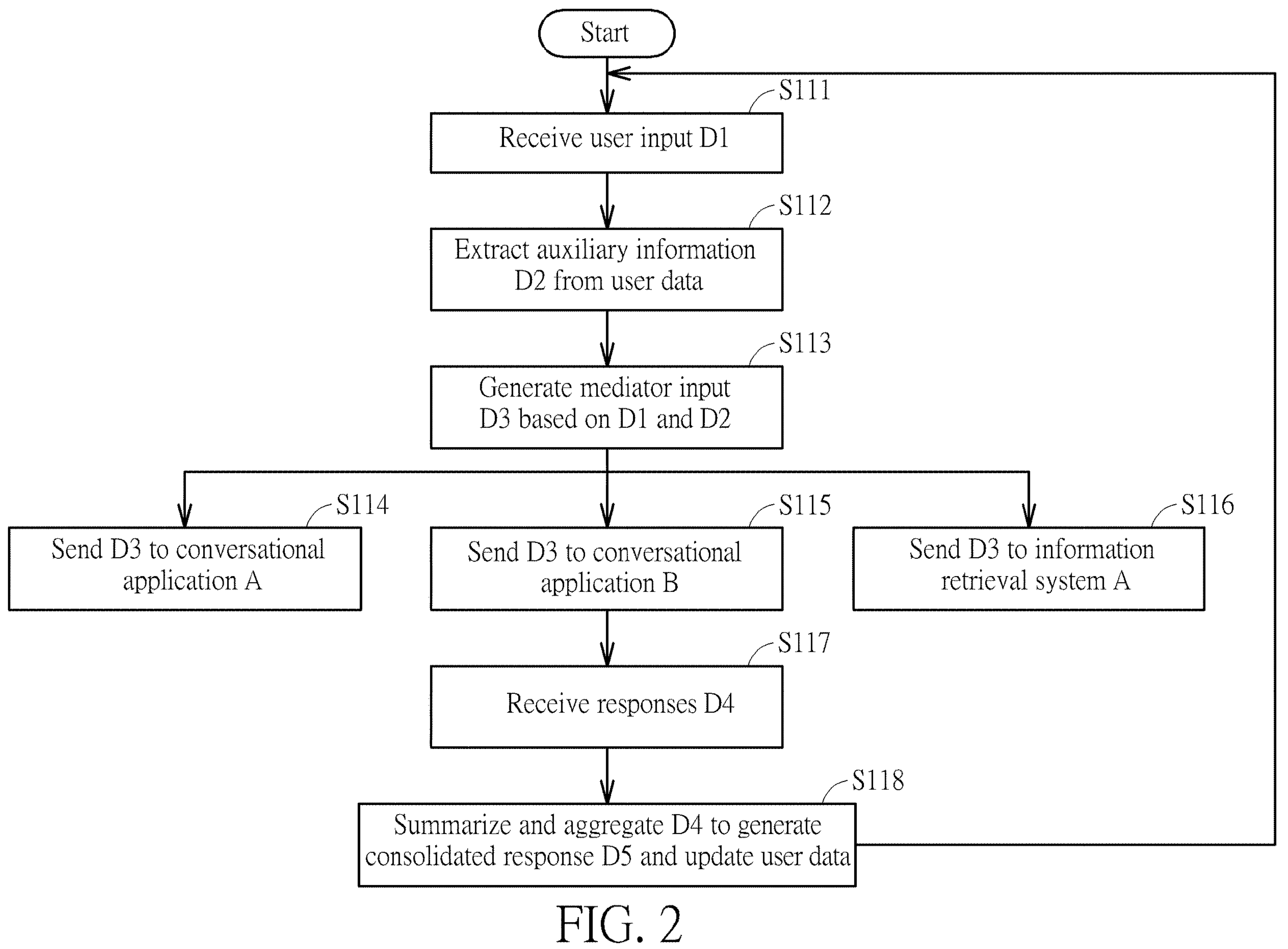
FIG. 2 illustrates a flow of interactions performed by the conversational mediator system according to a first embodiment of the present invention.

FIG. 2 illustrates a flow of interactions performed by the conversational mediator system 100 according to a first embodiment of the present invention. At step S111, a user input D1 is received by the conversational mediator system 100. At step 112, the conversational mediator system 100 searches user data to extract auxiliary information D2 that is associated with the user input D1. At step S113, the conversational mediator system 100 generates a mediating input D3 based on the user input D1 and the auxiliary information D2. At steps S114, 115 and 116, the conversational mediator system 100 sends the mediating input D3 to the conversational applications A and B, and the information retrieval systems A. At step S116, responses D4 to the mediating input D3, which are generated by the conversational applications A and B, and the information retrieval systems A, are received by the conversational mediator system 100. At step S117, the conversational mediator system 100 summarizes and aggregates the responses D4 and accordingly generates a consolidated response D5 to the user. In addition, information contained in the consolidated response D5 will be saved, as a part of the user data.

Figure 3:
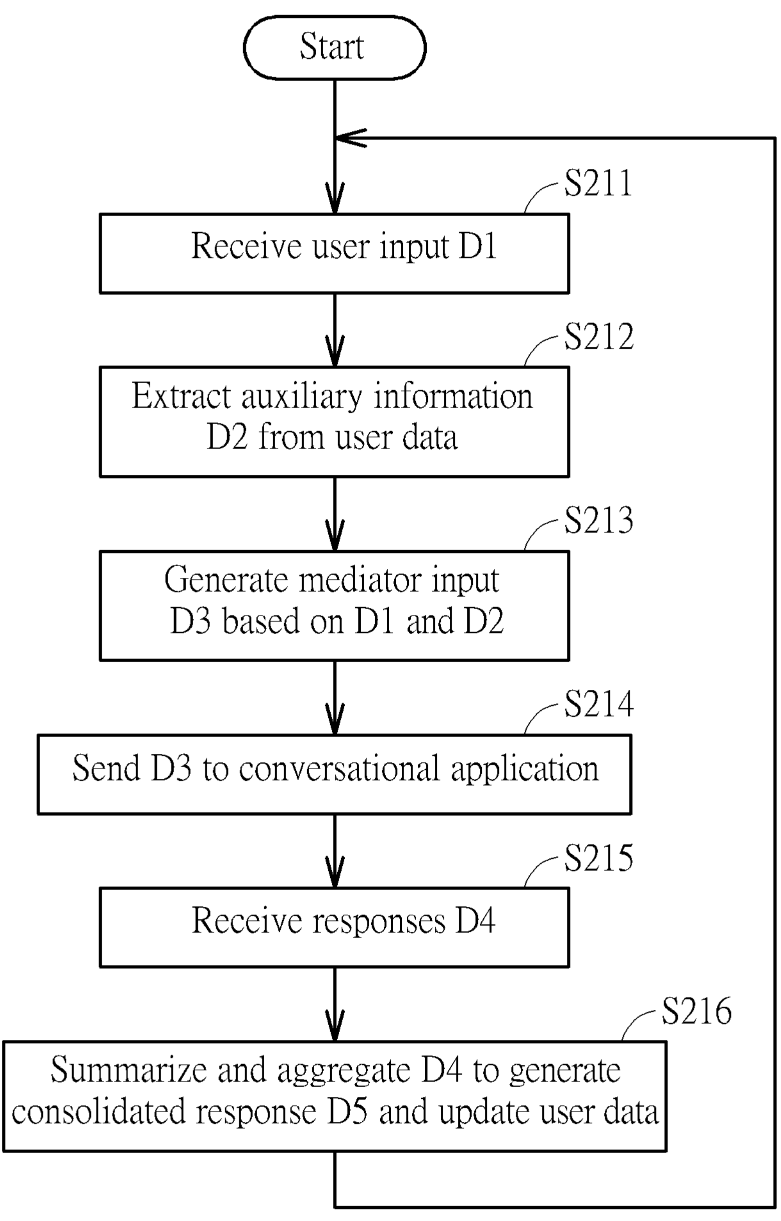
FIG. 3 illustrates a flow of interactions performed by the conversational mediator system according to a second embodiment of the present invention.

FIG. 3 illustrates a flow of interactions performed by the conversational mediator system 100 according to a second embodiment of the present invention. At step S211, a user input D1 is received by the conversational mediator system 100. At step 212, the conversational mediator system 100 searches user data to extract auxiliary information D2 that is associated with the user input D1. At step S213, the conversational mediator system 100 generates a mediating input D3 based on the user input D1 and the auxiliary information D2. At step S214, the conversational mediator system 100 sends the mediating input D3 to the conversational application. At step S215, responses D4 to the mediating input D3, which is generated by the conversational application, are received by the conversational mediator system 100. At step S216, the conversational mediator system 100 summarizes and aggregates the responses D4 and accordingly generates a consolidated response D5 to the user. Accordingly, information contained in the consolidated response D5 will be saved, as a part of the user data.

Figure 4:
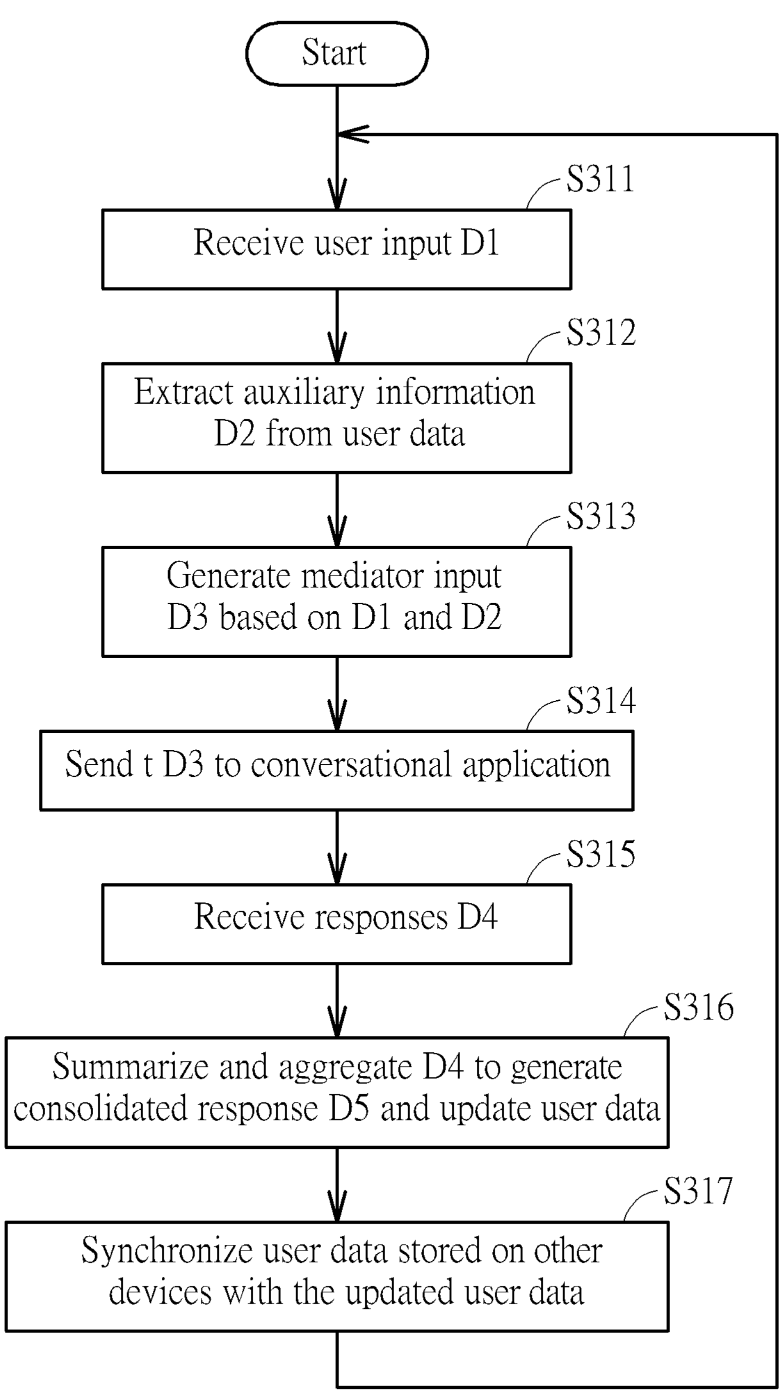
FIG. 4 illustrates a flow of interactions performed by the conversational mediator system according to a third embodiment of the present invention.

FIG. 4 illustrates a flow of interactions performed by the conversational mediator system 100 according to a third embodiment of the present invention. At step S311, a user input D1 is received by the conversational mediator system 100. At step 312, the conversational mediator system 100 searches user data to extract auxiliary information D2 that is associated with the user input D1. At step S313, the conversational mediator system 100 generates a mediating input D3 based on the user input D1 and the auxiliary information D2. At step S314, the conversational mediator system 100 sends the mediating input D3 to the conversational application. At step S315, responses D4 to the mediating input D3, which is generated by the conversational application, are received by the conversational mediator system 100. At step S316, the conversational mediator system 100 summarizes and aggregates the responses D4 and accordingly generates a consolidated response D5 to the user. Accordingly, information contained in the consolidated response D5 will be saved, as a part of the user data. At step S317, updating of user data will be synchronized between all the user devices 50_1-50_O belonging to the user 50.

Figure 5:
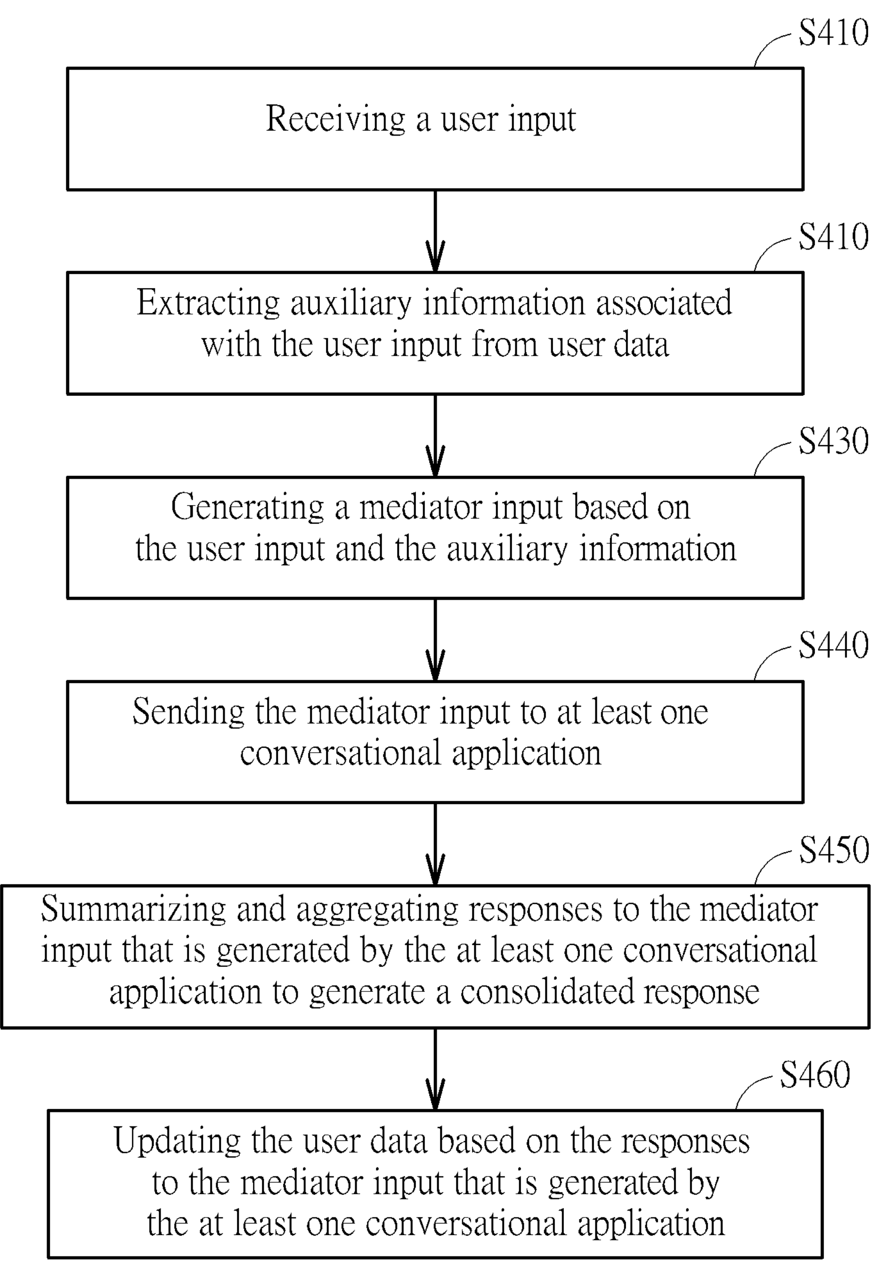
FIG. 5 illustrates a conversational mediating method according to one embodiment of the present invention.

FIG. 5 illustrates a conversational mediating method according to one embodiment of the present invention. As shown in the figure, the method of the present invention includes the following simplified flow:

Step S410: receiving a user input;

Step S420: extracting auxiliary information associated with the user input from user data;

Step S430: generating a mediator input based on the user input and the auxiliary information;

Step S440: sending the mediator input to at least one conversational application;

Step S450: summarizing and aggregating responses to the mediator input that is generated by the at least one conversational application to generate a consolidated response; and Step S460: updating the user data based on the responses to the mediator input that is generated by the at least one conversational application.

Since principles and specific details of the foregoing steps have been explained in detail through the above embodiments, further descriptions will not be repeated here. It should be noted that the above flow may be possible, by adding other extra steps or making appropriate modifications and adjustments, to better improve flexibility and further improve efficiency of the use of the conversational applications.

In conclusion, serving as an intermediary, the conversational mediator system and related method of the present invention converts the user input into a mediator input to facilitate intelligent interactions with various conversational applications. Benefiting from the auxiliary information extracted from the user data, the mediator input generated by the conversational mediator system is not just merely as a simplistic echo of user-expressed words, but rather as blend of user intent, contextual awareness, and refined understanding. Hence, the conversational mediator system and method of the present invention significantly ensures a more coherent, relevant, and user-friendly interaction experience and improves the quality and efficiency of interactions between the user and the conversational applications.

Embodiments in accordance with the present embodiments can be implemented as an apparatus, method, or computer program product. Accordingly, the present embodiments may take the form of an entirely hardware embodiment, an entirely software embodiment, or an embodiment combining software and hardware aspects that can all generally be referred to herein as a "module" or "system." Furthermore, the present embodiments may take the form of a computer program product embodied in any tangible medium of expression having computer-usable program code embodied in the medium. In terms of hardware, the present invention can be accomplished by applying any of the following technologies or related combinations: an individual operation logic with logic gates capable of performing logic functions according to data signals, and an application specific integrated circuit (ASIC), a programmable gate array (PGA) or a field programmable gate array (FPGA) with a suitable combinational logic.

The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It is also noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions. These computer program instructions can be stored in a computer-readable medium that directs a computer or other programmable data processing apparatus to function in a particular manner, such that the instructions stored in the computer-readable medium produce an article of manufacture including instruction means which implement the function/act specified in the flowchart and/or block diagram block or blocks.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A conversational mediator system, comprising:

a mediator input generating module, configured to generate a plurality of mediator inputs based on a user input and auxiliary information associated with the user input, and accordingly send the mediator inputs to a plurality of conversational applications; wherein the mediator input generating module is further configured to generate a first mediator input to be provided to a first conversational application of the conversational applications and a second mediator input different from the first mediator input to be provided to a second conversational application of the conversational applications, wherein the first mediator input and the second mediator input are generated based on the same user input and are respectively tailored in accordance with inherent characteristics and capabilities of the first conversational application and the second conversational application;

a context management module, configured to extract the auxiliary information from user data and update the user data based on responses to the mediator inputs that are generated by the conversational applications; and a response aggregation module, configured to summarize and aggregate the responses to the mediator inputs that are generated by the conversational applications to generate a consolidated response;

wherein the conversational applications are operated based on a generative artificial intelligence language model to comprehend, generate, and process natural language text in a conversational manner.

2. The conversational mediator system of claim 1, wherein the user data comprises personal information, behavioral information, preference information, and interaction history information.

3. The conversational mediator system of claim 1, wherein the mediator input generating module is further configured to send the mediator inputs to at least one information retrieval system, and the response aggregation module is configured to summarize and aggregate the responses to the mediator inputs from the conversational applications and the at least one information retrieval system to generate the consolidated response.

4. The conversational mediator system of claim 3, wherein the at least one information retrieval system is a search engine.

5. The conversational mediator system of claim 1, wherein the mediator input generating module is further configured to send the user input to at least one information retrieval system, and accordingly generate the mediator inputs based on response of the at least one information retrieval system, the user input and the auxiliary information.

6. The conversational mediator system of claim 1, wherein the context management module is further configured to synchronize updating of the user data between multiple user devices.

7. A conversational mediating method, comprising:

receiving a user input;

extracting auxiliary information associated with the user input from user data;

generating a plurality of mediator inputs based on the user input and the auxiliary information, comprising:

generating a first mediator input to be provided to a first conversational application of a plurality of conversational applications and a second mediator input different from the first mediator input to be provided to a second conversational application of the conversational applications, wherein the first mediator input and the second mediator input are generated based on the same user input and are respectively tailored in accordance with inherent characteristics and capabilities of the first conversational application and the second conversational application;

sending the mediator inputs to the conversational applications, comprising:

sending the first mediator input to the first conversational application and sending the second mediator input to the second conversational application;

summarizing and aggregating responses to the mediator inputs that are generated by the conversational applications to generate a consolidated response; and updating the user data based on the responses to the mediator inputs that are generated by the conversational applications;

wherein the conversational applications are operated based on generative artificial intelligence language models to comprehend, generate, and process natural language text in a conversational manner.

8. The conversational mediating method of claim 7, wherein the user data comprises personal information, behavioral information, preference information, and interaction history information.

9. The conversational mediating method of claim 7, further comprising:

sending the mediator inputs to at least one information retrieval system; and summarizing and aggregating the responses to the mediator inputs from the conversational applications and the at least one information retrieval system to generate the consolidated response.

10. The conversational mediating method of claim 9, wherein the at least one information retrieval system is a search engine.

11. The conversational mediating method of claim 7, further comprising:

send the user input to at least one information retrieval system; and generating the mediator inputs based on response of the at least one information retrieval system, the user input and the auxiliary information.

12. The conversational mediating method of claim 7, further comprising:

synchronize updating of the user data between multiple user devices.

* * * * *